United States Patent [19]
Berger et al.

[11] Patent Number: 4,586,884
[45] Date of Patent: May 6, 1986

[54] PNEUMATIC POWER TOOL WITH SPEED GOVERNOR

[75] Inventors: Karl G. Berger, Saltsjö-Duvnäs; Karl G. Kardén, Nacka, both of Sweden

[73] Assignee: Atlas Copco Aktiebolag, Nacka, Sweden

[21] Appl. No.: 718,197

[22] Filed: Apr. 1, 1985

Related U.S. Application Data

[60] Continuation of Ser. No. 648,347, Sep. 6, 1984, abandoned, which is a continuation of Ser. No. 436,627, Oct. 25, 1982, abandoned, which is a division of Ser. No. 434,179, Oct. 14, 1982, Pat. No. 4,465,443.

[30] Foreign Application Priority Data

Oct. 21, 1981 [SE] Sweden ............................ 8106210

[51] Int. Cl.⁴ ............................................. F01C 21/12
[52] U.S. Cl. ........................................ 418/43; 137/53
[58] Field of Search ................... 418/40–44; 137/50, 54, 56, 57; 415/35, 36, 38

[56] References Cited

U.S. PATENT DOCUMENTS

| | | | |
|---|---|---|---|
| 3,043,273 | 7/1962 | Schott | 418/43 |
| 3,048,150 | 8/1962 | Young | |
| 3,257,913 | 6/1966 | Broom et al. | 418/43 |
| 3,749,530 | 7/1973 | Amador | 418/41 |
| 4,278,103 | 7/1981 | Giardino | 418/41 |

Primary Examiner—John J. Vrablik
Attorney, Agent, or Firm—Frishauf, Holtz, Goodman & Woodward

[57] ABSTRACT

In a pneumatically powered portable tool there is provided a speed governor and an overspeed safety device the purpose of which are to ensure a predetermined maximum speed by controlling the air inlet flow to the motor. A cup-shaped shell insert (28) is detachably mounted in the housing (10) to form with the latter an air supply passage (58) and to support the valve means (51,53) of the overspeed safety device. The top surface of the shell insert (28) is exposed through an aperture (57) in the housing (10) and carries the maximum speed marking of the tool.

10 Claims, 7 Drawing Figures

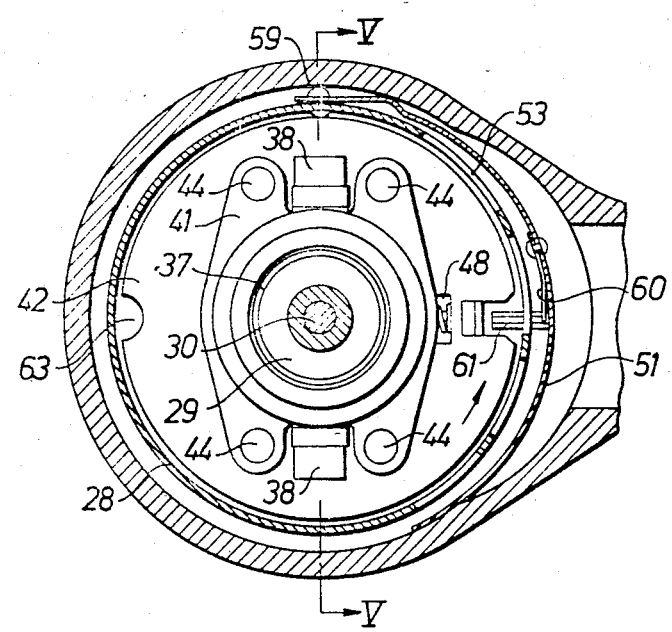
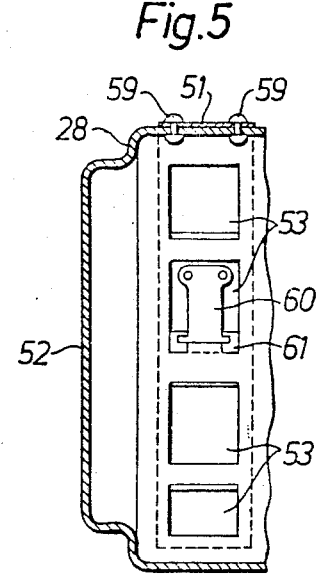
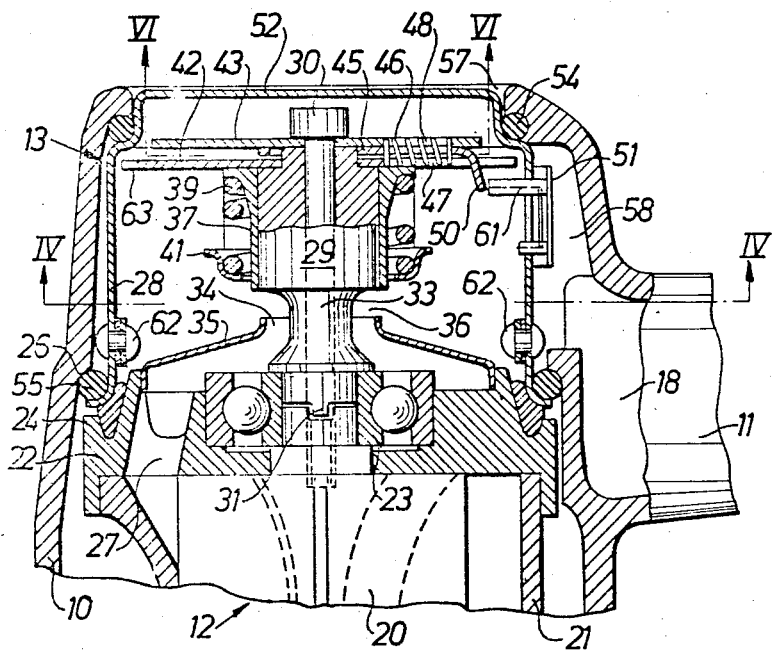

PNEUMATIC POWER TOOL WITH SPEED GOVERNOR

This application is a continuation of Ser. No. 648,347, filed Sept. 6, 1984, (now abandoned), which is a continuation of Ser. No. 436,627 filed Oct. 25, 1982 (now abandoned), and which in turn is a Divisional Application of Ser. No. 434,179 filed Oct. 14, 1982 (now U.S. Pat. No. 4,465,443 issued Aug. 14, 1984).

This invention relates to a pneumatic power tool having an air driven rotation motor supported in a portable housing and an air inlet passage in the housing.

In particular, the invention concerns a pneumatic power tool having a speed governor for controlling the air flow through the inlet passage. The speed governor comprises a centrifugal weight operated valve means movably supported on a rear extension of the motor rotor.

The object of the present invention is to provide a pneumatically powered rotation tool having an improved speed governor which has a faster response at rapid motor accelerations.

Further objects and advantages of the invention will be apparent from the following description.

BRIEF DESCRIPTION OF THE DRAWINGS

FIG. 3 shows a longitudinal section through the tool shown in FIG. 1.

FIG. 4 is a cross section taken along line IV—IV in FIG. 3,

FIG. 5 is a fragmental section mainly taken along line V—V in FIG. 4,

DETAILED DESCRIPTION

Figure 1:
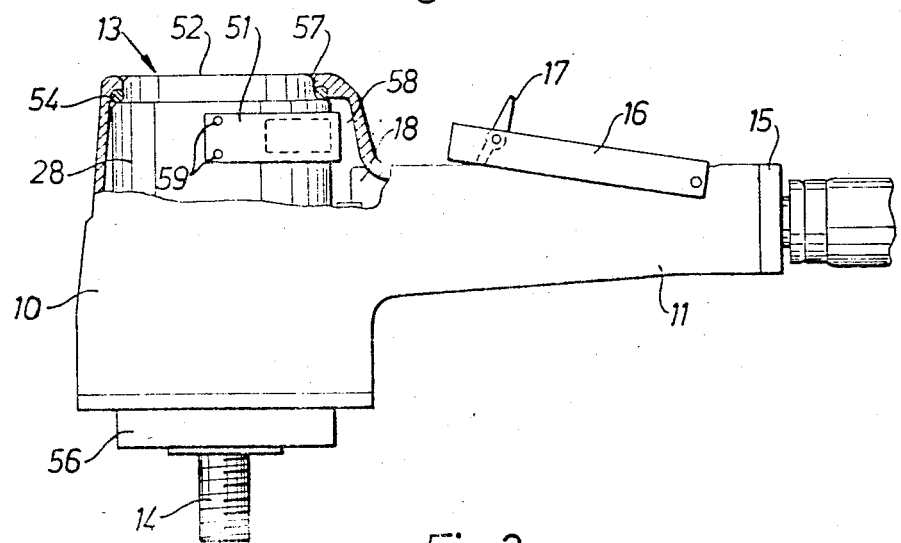
FIG. 1 shows a partly broken side view of a pneumatic power tool according to the invention.

The power tool shown in the drawing figures is a grinding machine which comprises a housing 10, a handle 11 formed integral with the housing 10, a rotation motor 12 of the sliding vane type and a safety unit 13. The motor 12 rotates an output shaft 14.

At its outer end the handle 11 is provided with a hose connection 15 through which motive pressure air is supplied to the machine. The air supply, however, is manually controlled by a throttle valve (not shown) via a lever 16. A spring biased safety latch 17 on the lever 16 is intended to prevent unintentional setting of the motor 12. The throttle valve communicates with the motor housing 10 through an inlet passage 18.

The motor 12 comprises a rotor 20, a cylinder 21 and end walls. The rear end wall 22, which is shown in FIG. 3, supports a ball bearing 23 for the rotor 20. Moreover, the rear end wall 22 is formed with an outer shoulder 24 by which the motor 12 is axially supported against an internal shoulder 26 in the housing 10. The rear end wall 22 of the motor 12 also comprises an air inlet port 27 through which motive air is fed into the cylinder 21.

The speed limiting safety unit 13 comprises a speed governor and an overspeed safety device. Both of these comprise speed responsive means which are surrounded by a stationary cup-shaped shell insert 28 and coupled to the rotor 20 by means of a hub 29. The latter is attached to the rotor 20 by means of a centrally located screw 30 and is positively coupled to the rotor 20 via axially directed dogs 31.

The hub 29 is formed with a waist portion 33 extending through the central aperture 34 of a cover washer 35 sealingly attached to the rear end wall 22 of the motor 12. The cover washer 35 is arranged to form with the waist portion 33 of the hub 29 an annular air passage 36 and to establish communication between that air passage 36 and the inlet port 27 of the motor 12.

The speed governor comprises a valve sleeve 37 axially movable on the hub 29 by means of two fly weights 38 and against the load of a spring 39. The latter acts between the sleeve 37 and a support member 41.

Figure 6:
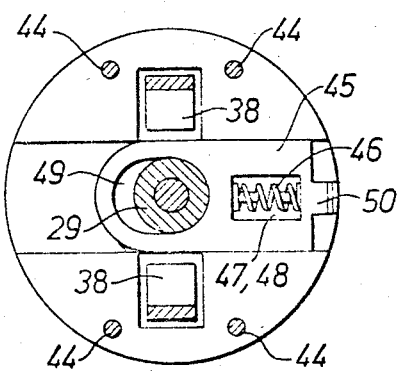
FIG. 6 is a transverse view, partly in section, taken along line VI—VI in FIG. 3.
Figure 7:
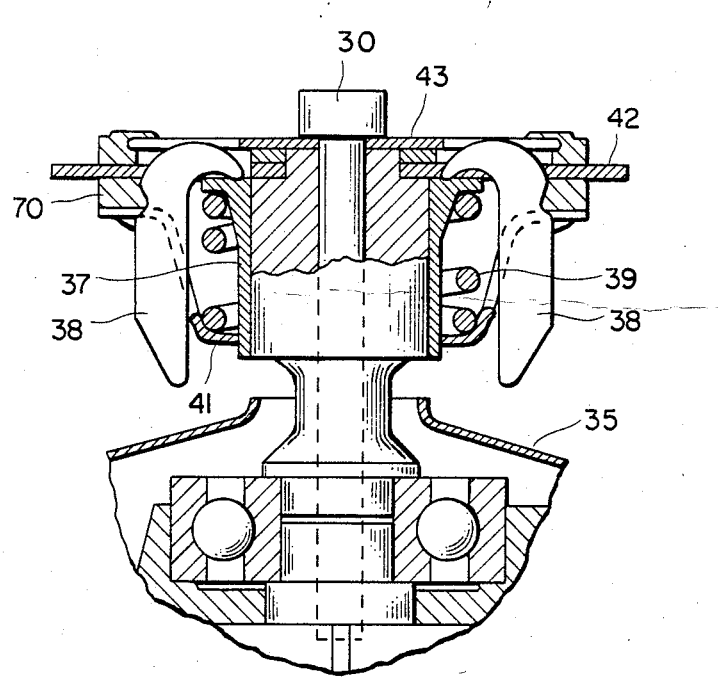
FIG. 7 is a sectional view showing a section transverse +o section V—V in FIG. 4.

On the top of the hub 29 there are mounted two discs 42 and 43 to which the support member 41 is connected by four studs 44 (illustrated in FIGS. 4 and 6 only). The ends of the studs 44 are upset to prevent the speed governor from being easily dismantled.

Within a predetermined speed range, the valve sleeve 37 is caused to move axially by the fly weights 38, thereby adapting the width of the annular air passage 36 and thereby the air flow to the actual operating condition of the motor 12.

Between the discs 42, 43 there is slidingly guided an actuator element 45 which is one of the components forming the releasable air shut-off mechanism. The actuator element 45 is radially movable by centrifugal action against the load of a spring 46 inserted in rectangular apertures 47, 48 in the discs 42, 43. As illustrated in FIG. 6, the actuator element 45 has an oval opening 49 surrounding the hub 29 for permitting the actuator element 45 to be disposed radially a limited distance. At its outer end the actuator element 45 is formed with a release dog 50.

The other component of the overspeed shut off mechanism is a curve shaped leaf spring valve 51 secured to the outside of the cup-shaped shell insert 28 by two rivets 59 and controlling a row of apertures 53 in the shell insert 28. The latter forms an insert member which is replaceably mounted in the housing 10. By means of two axially spaced O-rings 54 and 55, the shell insert 28 is sealingly supported in the housing 10. The shell insert 28 is introduced into the housing 10 from the lower end (in FIGS. 1, 3) before the motor 12 and is axially clamped against the housing 10 by the motor cylinder 21. The latter is in turn axially clamped by the lower end cover 56 of the housing 10 which is threaded onto the housing 10 in a conventional manner.

As apparent from FIGS. 1 and 3, the housing 10 is provided with an aperture 57 through which the upper end surface of the shell insert 28 is exposed. The upper O-ring 54 forms a seal by which pressure air is prevented from escaping out into the atmosphere. The shell insert 28 and the housing 10 define between the O-rings 54 and 55 an annular chamber 58 which communicates continuously with the air inlet passage 18. Accordingly, the motor 12 can not be started unless the shell insert 28 is properly mounted.

The shell insert 28 serves primarily as a passage forming means in that it is mounted in the housing 10 as a subhousing. The shell 28 thereby forms a barrier which permits pressure air to reach the motor inlet port 27 through the valve controlled apertures 53 only. The shell insert 28 is preferably a form pressed sheet steel detail.

On the leaf spring valve 51 there is mounted a spring 60 the purpose of which is to retain a trip element 61 in either of two alternative positions. In the drawing figures, the trip element 61 is shown in its untripped position in which it supports the leaf spring valve 51 in open position against the elastic force developed by the leaf spring itself. When hit by the release dog 50 of the actuator element 45, the trip element 61 is tilted 90 degrees and gives the leaf spring valve 51 free to occupy its closed position.

Figure 2:
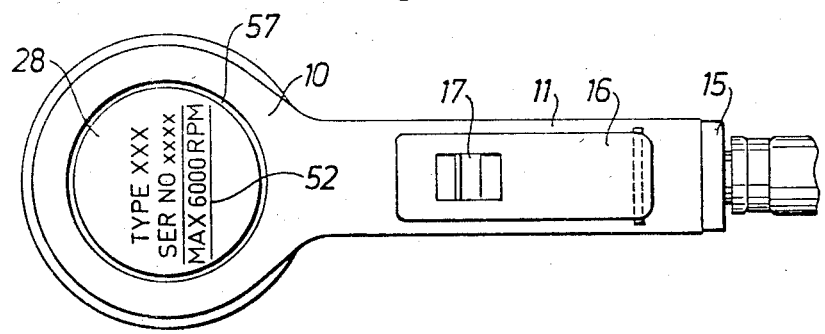
FIG. 2 is a top view of the tool shown in FIG. 1.

As illustrated in FIG. 2, the upper end surface of the shell insert 28 is provided with a maximum speed mark 52. Because of the arrangement of the end surface of the shell insert 28 being exposed through the aperture 57, the maximum speed mark 52 of the tool can be located to the shell insert 28. By this arrangement it is effectively avoided that a safety means intended for a different maximum speed than what is marked on the tool is fitted.

In operation of the tool, motive pressure air is supplied to the air inlet passage 18 in the housing 10 via the throttle valve. Under normal conditions, i.e. when everything is in perfect order, the air flow to the motor 12 is adapted to the actual motor speed by means of the fly weight actuated speed governor valve 37. This means that the motor speed is prevented to reach above a certain safety limit, expecially at idle running of the tool.

If for some reason the speed governor becomes incapable of keeping down the motor speed, the centrifugal action on the actuator element 45 will overcome the preload of spring 46 and move the actuator element 45 radially such that release dog 50 hits the trip element 61. Thereby, the trip element 61 is tilted to its inactive position and the leaf spring 51 is shifted to its closed position. In this position, the air inlet flow through the apertures 53 is choked and the motor 12 is stopped.

Since the speed governor and the overspeed release mechanism have to be carefully adapted to each other as far as the maximum speed levels are concerned, it is a good idea to let these two means form a unit which is not possible to dismantle without damaging one or more details. In the shown embodiment this is obtained by upsetting the ends of the studs 44, which means that the studs 44 have to be cut off or machined down at their upset ends to dismantle the safety unit.

It is emphasized that the invention is not limited to the shown and described example but may be freely varied within the scope of the claims.

What is claimed is:

1. A pneumatic power tool comprising:
    a housing;
    a rotary vane motor located in said housing and including a rotor drivingly connected to an output spindle, said rotor having a rear extension, and said vane motor having a rear end wall;
    a pressure air supply passage in said housing communicating with said vane motor;
    a speed governor including a tubular valve element supported on and axially movable relative to said rear extension of said rotor, and a speed responsive actuating means coupled to said valve element for moving said valve element at motor speeds above a certain level;
    a passage forming means immovably associated with said rear end wall of said vane motor, said passage forming means forming a part of said air supply passage and including an air inlet opening concentrically disposed relative to said rotor;
    said rear extension of said rotor extending through said air inlet opening of said passage forming means; and
    said tubular valve element being located upstream of said passage forming means and being arranged to cooperate with said passage forming means to control the air flow through said air inlet opening.

2. The power tool of claim 1, wherein said passage forming means comprises an annular washer.

3. The power tool of claim 2, wherein said annular washer comprises a generally frusto-conical washer-like member having outer edges which are connected with said rear end wall of said vane motor.

4. The power tool of claim 3, wherein said washer-like member is a cover member around a rear portion of said rear end wall of said vane motor.

5. The power tool of claim 2, wherein said annular washer comprises a cover member cooperatively coupled to the rear side of said rear end wall of said vane motor.

6. The power tool of claim 1, wherein said rear extension of said rotor extends rearwardly of said rear end wall of said rotary vane motor.

7. The power tool of claim 6, wherein said passage forming means is intermediate said rear end wall of said rotary vane motor and at least a portion of said rear extension of said rotor.

8. The power tool of claim 2, wherein said rear extension of said rotor extends rearwardly of said rear end wall of said rotary vane motor.

9. The power tool of claim 8, wherein said annular washer extends rearwardly of said rear end wall of said rotary vane motor, and terminates short of the end of said rear extension of said rotor.

10. The power tool of claim 9, wherein said annular washer terminates between said speed governor and said rear end wall of said rotary vane motor.

* * * * *